United States Patent
Nagaoka et al.

[11] Patent Number: 6,113,280
[45] Date of Patent: Sep. 5, 2000

[54] CAP FOR OPTICAL CONNECTOR

[75] Inventors: Yasutaka Nagaoka; Nobuhiko Suzuki, both of Shizuoka, Japan

[73] Assignee: Yazaki Corporation, Tokyo, Japan

[21] Appl. No.: 09/229,674

[22] Filed: Jan. 13, 1999

[30] Foreign Application Priority Data

Jan. 13, 1998 [JP] Japan ................................... 10-004934

[51] Int. Cl.⁷ ...................................................... G02B 6/36
[52] U.S. Cl. ............................... 385/53; 385/92; 385/90; 385/94
[58] Field of Search ................................ 385/53, 88, 92, 385/89, 90, 91, 93, 94, 147, 141, 56

[56] References Cited

U.S. PATENT DOCUMENTS 5,305,408  4/1994  Schffer et al. ............................ 385/92

FOREIGN PATENT DOCUMENTS 0 121 460  10/1984  European Pat. Off. .......... G02B 7/26
63-128511  8/1988  Japan ............................... G02B 6/42

*Primary Examiner*—Phan T. H. Palmer
*Attorney, Agent, or Firm*—Sughrue, Mion, Zinn, Macpeak & Seas, PLLC

[57] ABSTRACT

In a cap for an optical connector, light-receiving/emitting modules are inserted in a housing body, and the cap is attached to the housing body, so that the light-receiving/emitting modules are fixed by the cap. Protuberances are formed on the cap, and project in an attaching direction so as to be abutted against the light-receiving/emitting modules to prevent the light-receiving/emitting modules from being displaced out of position. The protuberances have elasticity. Opposite ends of each of the protuberances may be cut off at an acute angle, so that a distal end of the protuberance is substantially pointed. Alternatively, each of the protuberances is longitudinally cut into a half.

4 Claims, 7 Drawing Sheets

CAP FOR OPTICAL CONNECTOR

BACKGROUND OF THE INVENTION

1. Field of the Invention

This invention relates to a cap for an optical connector, in which light-receiving/emitting modules, inserted in a housing body of the optical connector, are fixed by a cap attached to the housing body.

2. Description of the Related Art

There has heretofore been proposed an optical connector as shown in FIG. 9 (Japanese Utility Model Unexamined Publication No. Sho. 63-128511).

As shown in FIGS. 9 and 10, this optical connector 71 has a pair of reception tubes 73 and 73 formed within a housing body 72, and cylindrical sleeves 74 are inserted respectively in front portions of the reception tubes 73, and light-receiving/emitting modules 76 are received in a receiving chamber 75 in the housing body 72, and elastic back sheets 77 are held against the light-receiving/emitting modules 76, respectively, and a cap 78 is pushed from the front side of the housing body 72 to be attached to this housing body 72, and a housing cap 81 is attached to the housing body from its rear side. Reference numeral 82 designates a front sheet.

The back sheet 77, provided between the light-receiving/emitting module 76 and the cap 78, protects the light-receiving/emitting module 76, and prevents the light-receiving/emitting module 76 from being displaced out of position.

However, since the back sheets 77, which are separate members, are used, the number of the component parts of the optical connector 71 is increased, and the operation for attaching the cap 78 to the housing body 72 has been cumbersome. The back sheets 77 are made of silicon rubber, and the cap 78 is made of PBT (polybutylene terephthalate), and therefore it is impossible to form the back sheets 77 and the cap 78 into an integral construction. Therefore, there has been a drawback that the manufacturing cost is high.

SUMMARY OF THE INVENTION

With the above problems in view, it is an object of this invention to provide a cap for an optical connector which reduces the number of component parts of the optical connector, and can be easily attached to a housing body.

In order to achieve the above object, the invention provides a cap for an optical connector in which a light-receiving/emitting module is inserted in a housing body, and the cap is attached to the housing body, so that the light-receiving/emitting module is fixed by the cap, wherein a protuberance is formed on the cap, and project in an attaching direction so as to be abutted against the light-receiving/emitting module to prevent the light-receiving/emitting module from being displaced out of position.

DETAILED DESCRIPTION OF THE PREFERRED EMBODIMENT

A preferred embodiment of the present invention will now be described with reference to the drawings.

FIGS. 1 to 8 show a preferred embodiment of a cap for an optical connector of the invention. The constituent members, identical to those of the conventional construction, will be referred to in the same manner, and detailed description thereof will be omitted.

Figure 1:
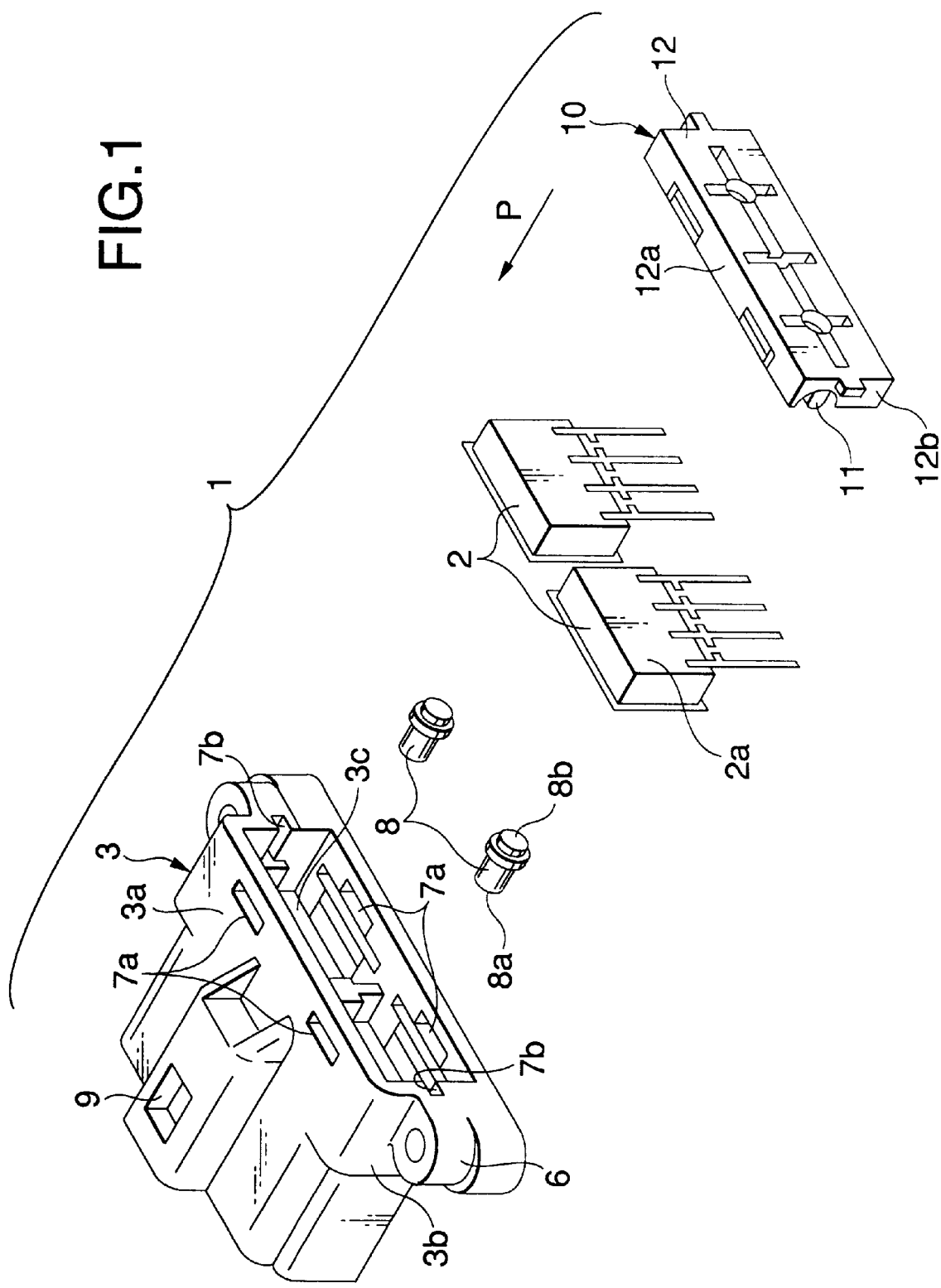
FIG. 1 is an exploded, perspective view showing an optical connector including a preferred embodiment of a cap for an optical connector of the present invention.

In FIG. 1, the cap for an optical connector (hereinafter referred to as "cap") 10 has elastic protuberances 11 for abutment against light-receiving/emitting modules 2, the protuberances 11 projecting in a direction (hereinafter referred to as "direction P") of attachment of the cap 10.

Figure 2:
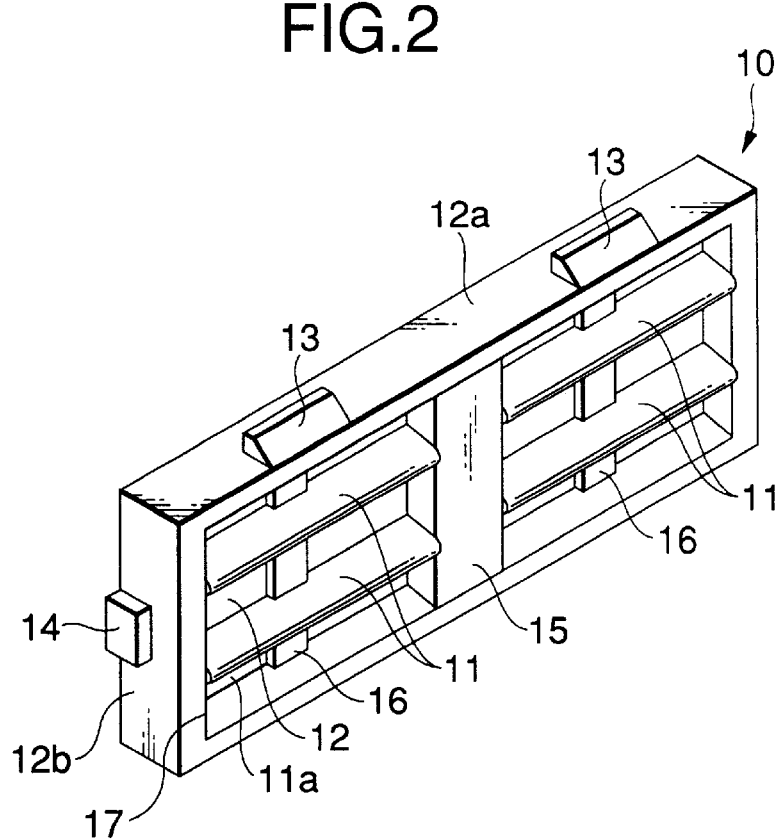
FIG. 2 is an enlarged, perspective view of the cap of FIG. 1.

As shown in FIG. 2, the cap 10 has upper and lower side walls 12a and right and left side walls 12b which are formed on a peripheral edge portion of a rectangular base plate 12. A pair of retaining projections 13 and 13 are formed on each of the upper and lower side walls 12a and 12a, and a guide rib 14 is formed on each of the right and left side walls 12b and 12b, and projects in the attaching direction (direction P). A partition wall 15, as well as a pair of ribs 16 and 16 parallel to the partition wall 15, is formed and extends between the upper and lower side walls 12a and 12a, and the protuberances 11 are formed across the rib 16, and extend between the right side wall 12b and the partition wall 15, and the other protuberances 11 are also formed across the rib 16, and extend between the left side wall 12b and the partition wall 15.

In this embodiment, although the two protuberances 11 are provided on each side, one or more than two protuberances can be provided.

Figure 3:
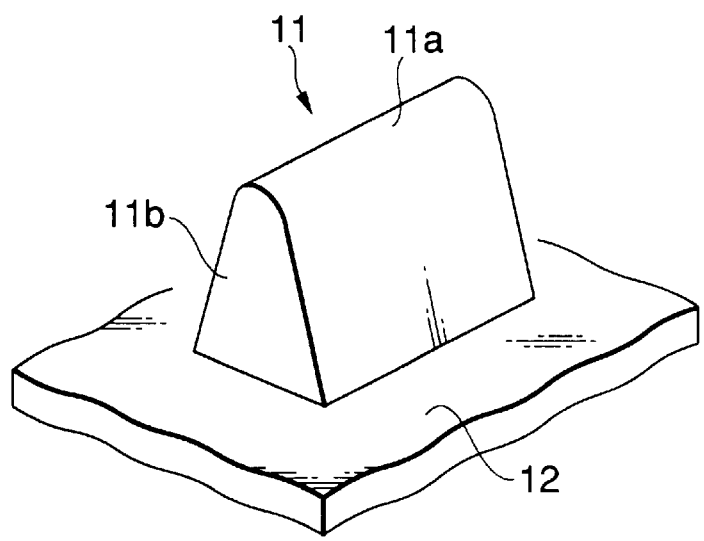
FIG. 3 is an enlarged, perspective view of a protuberance of FIG. 2.

The protuberance 11 has an elongate body tapering toward its distal end (FIG. 3). Each of the protuberances 11 extends in a direction of the length of the base plate 12. The distance between the two protuberances 11 is set to a desired value. The distal end 11a of the protuberance 11 projects outwardly slightly beyond a plane of an opening 17 defined by the upper and lower side walls 12a and the right and left side walls 12b. With this construction, when the cap 10 is attached to a housing body 3, the protuberances 11 are abutted against the light-receiving/emitting modules 2 in an urged condition. Therefore, the light-receiving/emitting modules 2 are prevented from being displaced out of position.

Figure 4:
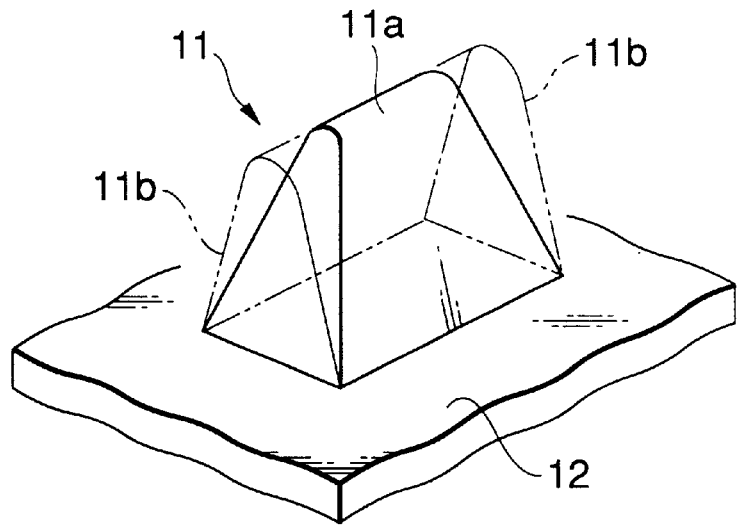
FIG. 4 is a perspective view of a modified example of the protuberance of FIG. 3.
Figure 5:
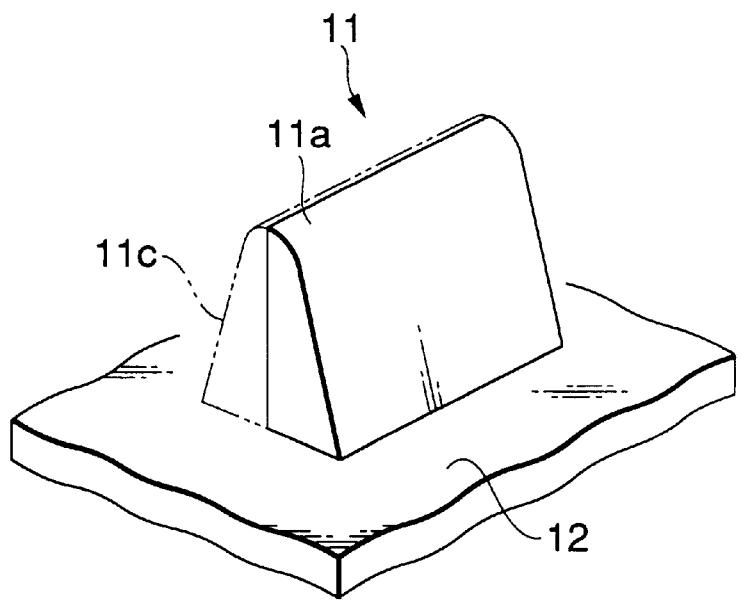
FIG. 5 is a perspective view of another modified example of the protuberance of FIG. 3.

FIG. 4 shows a modified example of the protuberance 11, in which opposite ends 11b and 11b of the protuberance 11 are cut off, so that the distal end 11a is substantially pointed. FIG. 5 shows another modified example of the protuberance 11, in which the protuberance 11 is cut longitudinally into a half 11c. In the former modified example, the opposite ends 11b and 11b of the protuberance 11 are cut off at an acute angle, so that the distal end 11a is substantially pointed, and therefore the distal end 11a can be abutted against the light-receiving/emitting module 2 (see FIG. 1) more positively. In the latter modified example, the protuberance 11 is longitudinally cut into a half, and therefore the cost of a resin material, used for the cap 10 (see FIG. 1), is reduced while substantially maintaining the elasticity of the protuberance 11. Other shapes than the above-mentioned shapes can be used if such shapes can enhance the elasticity of the protuberance 11.

Figure 6:
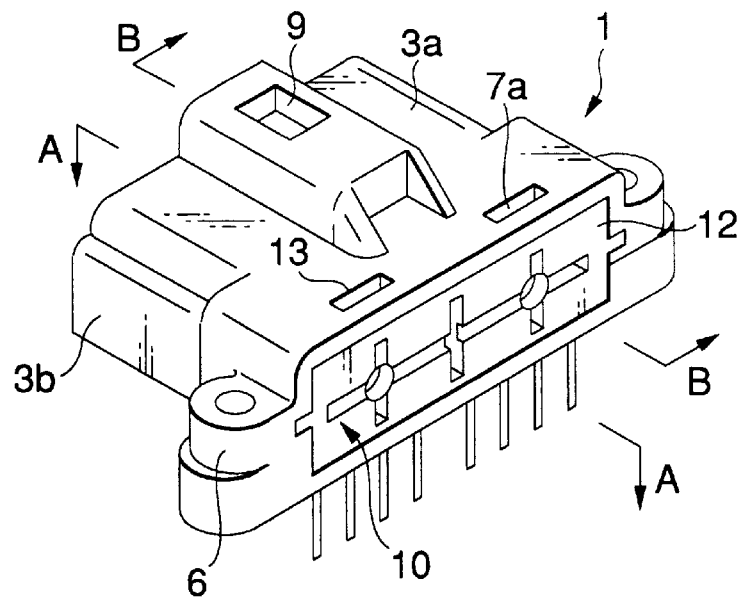
FIG. 6 is a perspective view showing the optical connector of FIG. 1 in its assembled condition.
Figure 7:
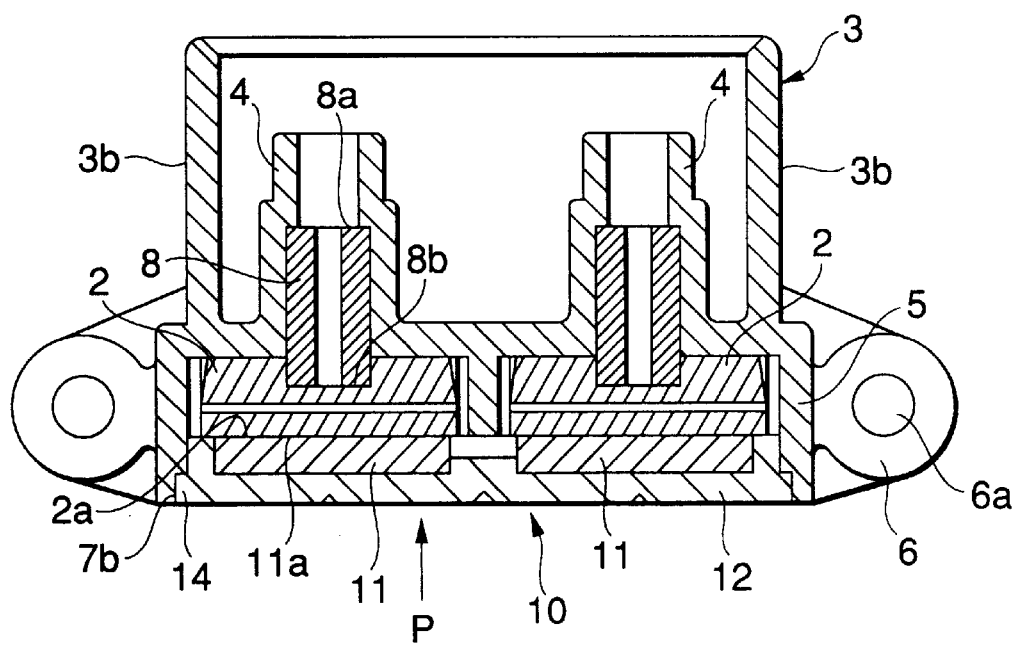
FIG. 7 is a cross-sectional view taken along the line A—A of FIG. 6.
Figure 8:
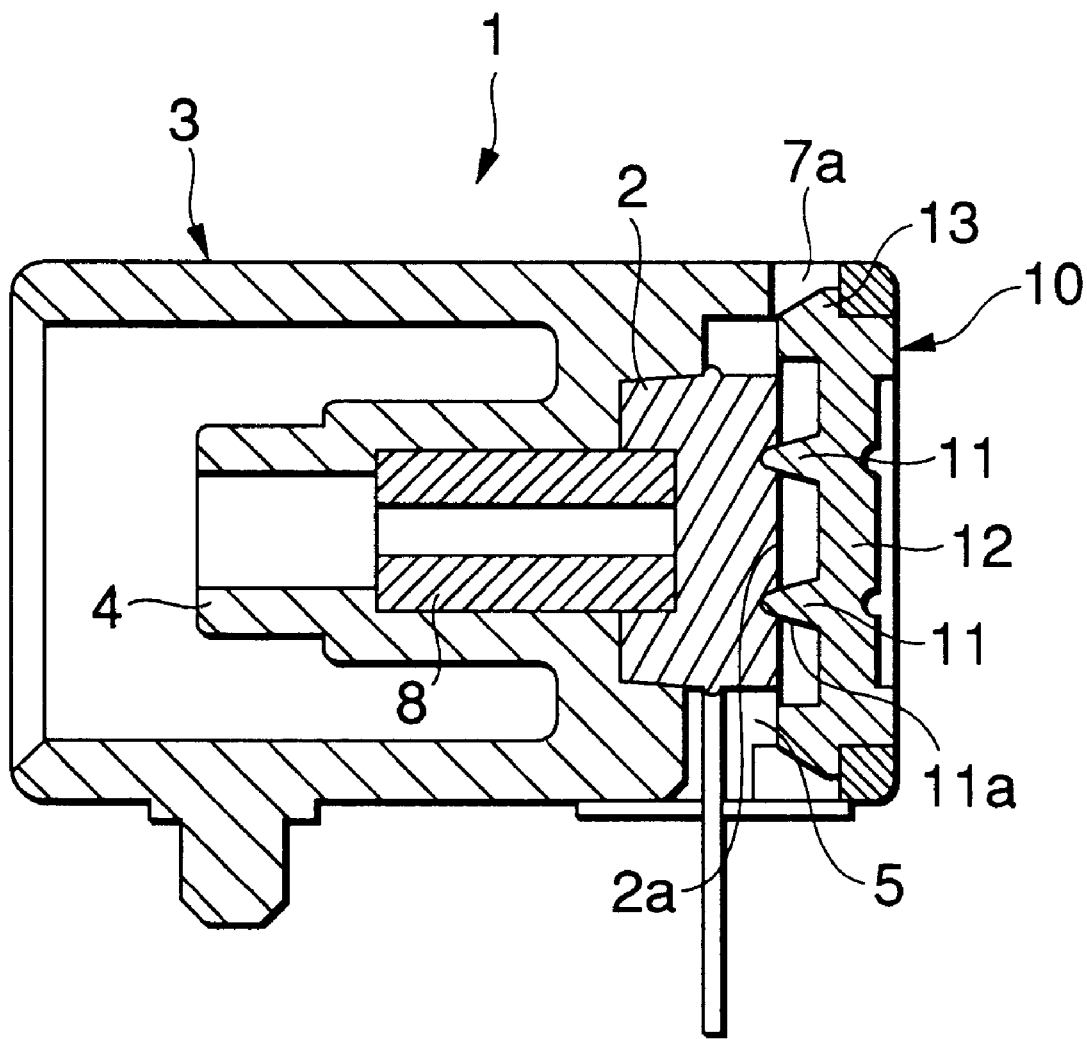
FIG. 8 is a cross-sectional view taken along the line B—B of FIG. 6.

As shown in FIGS. 6 to 8, a pair of reception tubes 4 and 4 are formed within the housing body 3, and extend in a forward-rearward direction, and a receiving chamber 5 for receiving the light-receiving/emitting modules 2 is formed forwardly of the reception tubes 4. Fixing portions 6 each having a screw hole 6a are formed respectively on outer surfaces of right and left side walls 3b and 3b of the housing body 3, and a pair of retaining holes 7a and 7a are formed through each of upper and lower side walls 3a and 3a, and guide grooves 7b are formed respectively in the right and left side walls 3b and 3b. Sleeves 8 are inserted respectively into the reception tubes 4 from the front side. A lock hole 9 for fixing a housing cap (not shown) is formed in the upper side wall 3a of the housing body 3. The light-receiving/emitting module 2 effects the conversion between an electrical signal and an optical signal.

Next, description will be made of an assembling operation in which the light-receiving/emitting modules 2 are inserted into the housing body 3, and then the cap 10 is attached to the housing body 3.

As shown in FIGS. 6 to 8, one end portions 8a of the cylindrical sleeves 8 are inserted respectively into the reception tubes 4 of the housing body 3 from the front side. The light-receiving/emitting modules 2 are received in the receiving chamber 5, and the other ends 8b of the sleeves 8 are abutted respectively against the light-receiving/emitting modules 2. The cap 10 is pushed into an opening 3c (FIG. 1) in the housing body 3 while the guide ribs 14 of the cap 10 are guided respectively by the guide grooves 7b in the housing body 3. The protuberances 11 of the cap 10 abut against outer surfaces 2a of the light-receiving/emitting modules 2, and the cap 10 is further pushed until the retaining projections 13 of the cap 10 are engaged respectively in the retaining holes 7a of the housing body 3. As a result, the cap 10 is attached to the housing body 3.

When the cap 10 is pushed into the housing body 3, the light-receiving/emitting modules 2 are pushed rearwardly (in the direction P) by the protuberances 11. Since the protuberances 11 has elasticity, the distal end portions 11a of the protuberances 11 are held in intimate contact with the light-receiving/emitting modules 2. As a result, the light-receiving/emitting modules 2 are prevented from being displaced out of position. An excessive force will not act on the light-receiving/emitting modules 2, and therefore damage to the light-receiving/emitting modules is prevented.

Figure 9:
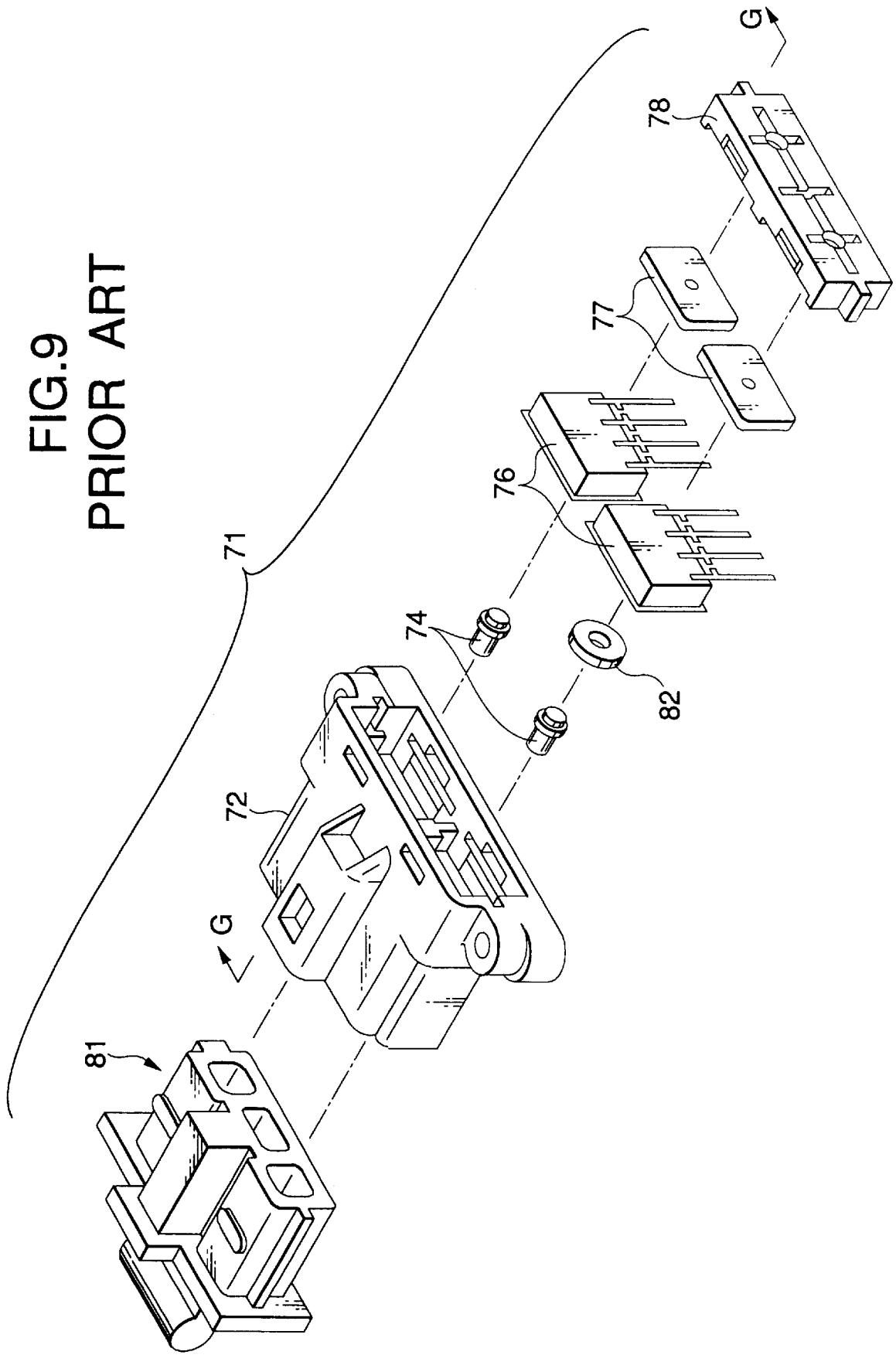
FIG. 9 is an exploded, perspective view of a conventional optical connector.
Figure 10:
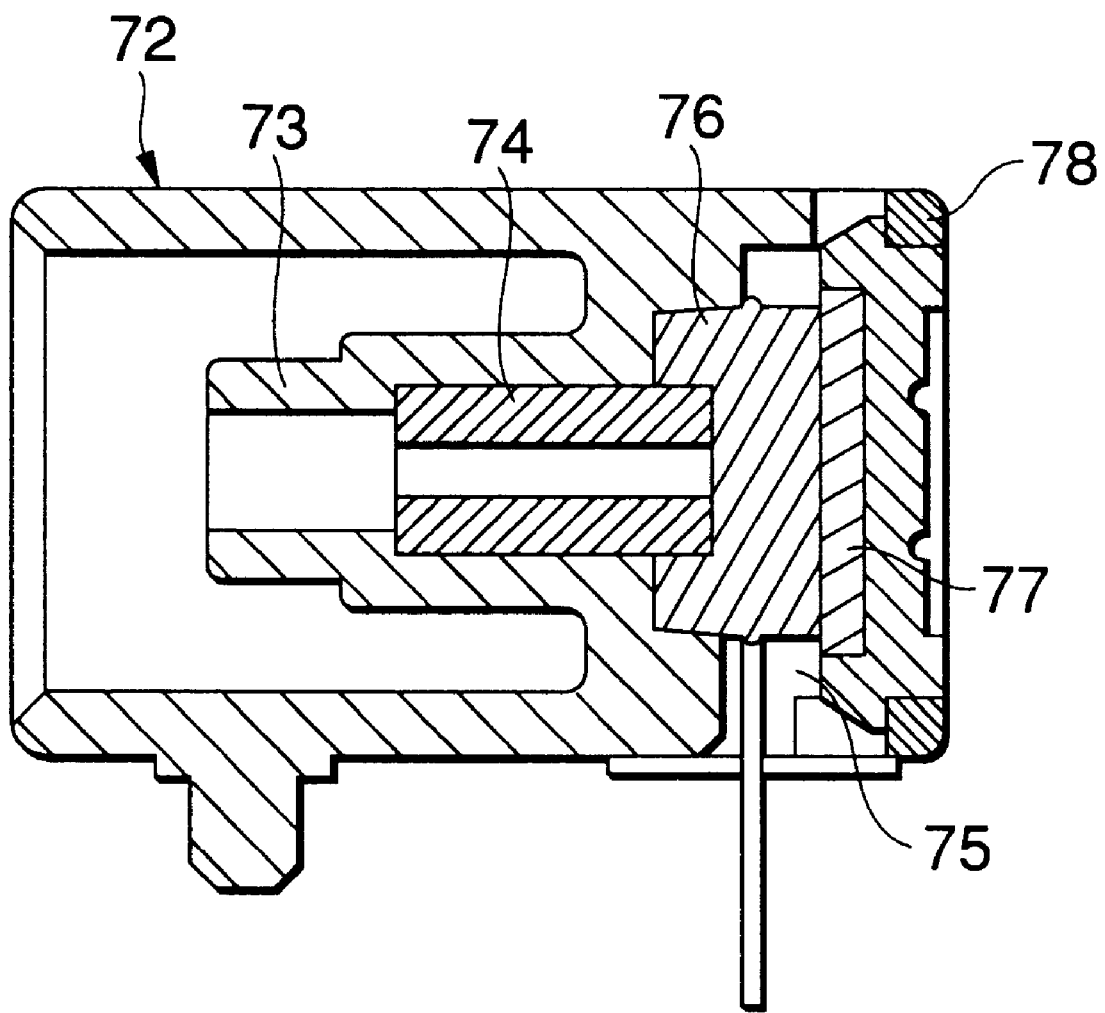
FIG. 10 is a view taken along the line G—G of FIG. 9.

In contrast with the conventional construction, the back sheets 77 (see FIG. 9) are not used, the number of the component parts of the optical connector 1 is reduced, and the assembling operation can be effected easily. Besides, because of the reduced number of the component parts, the manufacturing cost of the optical connector 1 can be reduced.

The members, which prevent the displacement of the light-receiving/emitting modules 2 (that is, fix these modules 2 against movement), are the distal end portions 11a of the protuberances 11, and therefore the areas of contact of these portions with the light-receiving/emitting modules 2, received in the receiving chamber 5, are smaller as compared with the conventional construction. Therefore, the surface area of each light-receiving/emitting module 2, exposed to the ambient air, is increased. Therefore, the heat-radiating effect of the light-receiving/emitting modules 2 is further enhanced.

As described above, in the invention, the protuberances are formed on the cap which is attached to the housing body, and these protuberances project in the attaching direction. With this construction, when the cap is attached to the housing body, the protuberances are abutted against the light-receiving/emitting module in an urged condition, so that the displacement of the light-receiving/emitting module is prevented. Since the protuberances are formed on the cap, the number of the component parts of the optical connector is reduced as compared with the conventional construction. Therefore, the assembling operation, in which the light-receiving/emitting module is fixed to the housing body, can be effected easily. Besides, since the protuberances serve to fix the light-receiving/emitting module, the areas of contact with the light-receiving/emitting module are smaller as compared with the conventional construction. Therefore, the heat-radiating effect of the light-receiving/emitting module is enhanced.

What is claimed is:

1. A cap for an optical connector in which a light-receiving/emitting module is inserted in a housing body, and said cap is attached to the housing body, so that the light-receiving/emitting module is fixed by said cap, wherein a protuberance is formed on said cap, and project in an attaching direction so as to be abutted against the light-receiving/emitting module to prevent the light-receiving/emitting module from being displaced out of position.

2. The cap according to claim 1, wherein the protuberance has elasticity.

3. The cap according to claim 1, wherein opposite ends of the protuberance are cut off at an acute angle, so that a distal end of the protuberance is substantially pointed.

4. The cap according to claim 1, wherein the protuberance is longitudinally cut into a half.

* * * * *